United States Patent [19]

Engler

[11] Patent Number: 5,687,669
[45] Date of Patent: Nov. 18, 1997

[54] AMPHIBIOUS VEHICLE

[76] Inventor: Manfred W. Engler, 3201 Conger St., Port Huron, Mich. 48060

[21] Appl. No.: 569,592

[22] Filed: Dec. 8, 1995

[51] Int. Cl.$^6$ ........................................... B60F 3/00
[52] U.S. Cl. ........................ 114/270; 180/400; 296/213; 440/42
[58] Field of Search ........................ 114/361, 270, 114/201 R, 344; 440/42, 40, 43; 296/213; 180/400

[56] References Cited

U.S. PATENT DOCUMENTS

| | | | |
|---|---|---|---|
| 1,679,526 | 8/1928 | Isherwood et al. | 114/201 |
| 2,350,037 | 5/1944 | Hofheins et al. | 114/270 |
| 3,153,396 | 10/1964 | Pender . | |
| 3,208,421 | 9/1965 | Landes et al. | 114/292 |
| 3,438,073 | 4/1969 | Brown | 114/361 |
| 3,741,146 | 6/1973 | Durrell, Jr. | 114/270 |
| 3,765,368 | 10/1973 | Asbeck | 114/270 |
| 3,797,056 | 3/1974 | Brady | 114/344 |
| 3,877,094 | 4/1975 | Kelley | 114/344 |
| 3,903,831 | 9/1975 | Bartlett et al. | 114/270 |
| 3,941,074 | 3/1976 | Millerbernd | 114/270 |
| 4,241,686 | 12/1980 | Westphalen | 114/270 |
| 4,838,194 | 6/1989 | Willaimson | 114/270 |
| 4,917,637 | 4/1990 | Soga et al. | 440/43 |
| 5,113,779 | 5/1992 | Amrein et al. | 114/270 |
| 5,176,098 | 1/1993 | Royle | 114/344 |
| 5,181,478 | 1/1993 | Berardi | 114/270 |
| 5,199,372 | 4/1993 | Seligman et al. | 114/270 |
| 5,299,523 | 4/1994 | Kovacs et al. | 114/270 |
| 5,304,078 | 4/1994 | Kaneko | 440/42 |

FOREIGN PATENT DOCUMENTS

| | | | |
|---|---|---|---|
| 952371 | 8/1974 | Canada . | |
| 1.406.563 | 11/1965 | France . | |
| 405294284 | 11/1993 | Japan | 440/42 |
| 2 276 127 A | 9/1994 | United Kingdom . | |
| WO 88/05007 | 7/1988 | WIPO . | |

*Primary Examiner*—Sherman Basinger
*Attorney, Agent, or Firm*—Harness, Dickey & Pierce, P.L.C.

[57] ABSTRACT

An amphibious vehicle having a pontoon assembly including a pair of pontoons and a set of wheels operably attached to the pontoons which are pivotally coupled to a vehicle frame structure such that the pontoons are positionable between a raised position whereby the wheels are deployed for providing land travel and a lowered position whereby the pontoons are deployed for providing marine travel. A pivot assembly interconnects the pontoon assembly to the frame structure. The amphibious vehicle further includes an engine, a jet propulsion unit and a drive train for selectively transmitting torque generated by the engine to the wheels for propelling the amphibious vehicle during land use and to the jet drive for propelling the amphibious vehicle during marine use. A mechanical steering interlock positively connects and disconnects the steering of the set of wheel when the pontoon assembly is positioned in the raised and lowered positions respectively.

31 Claims, 8 Drawing Sheets

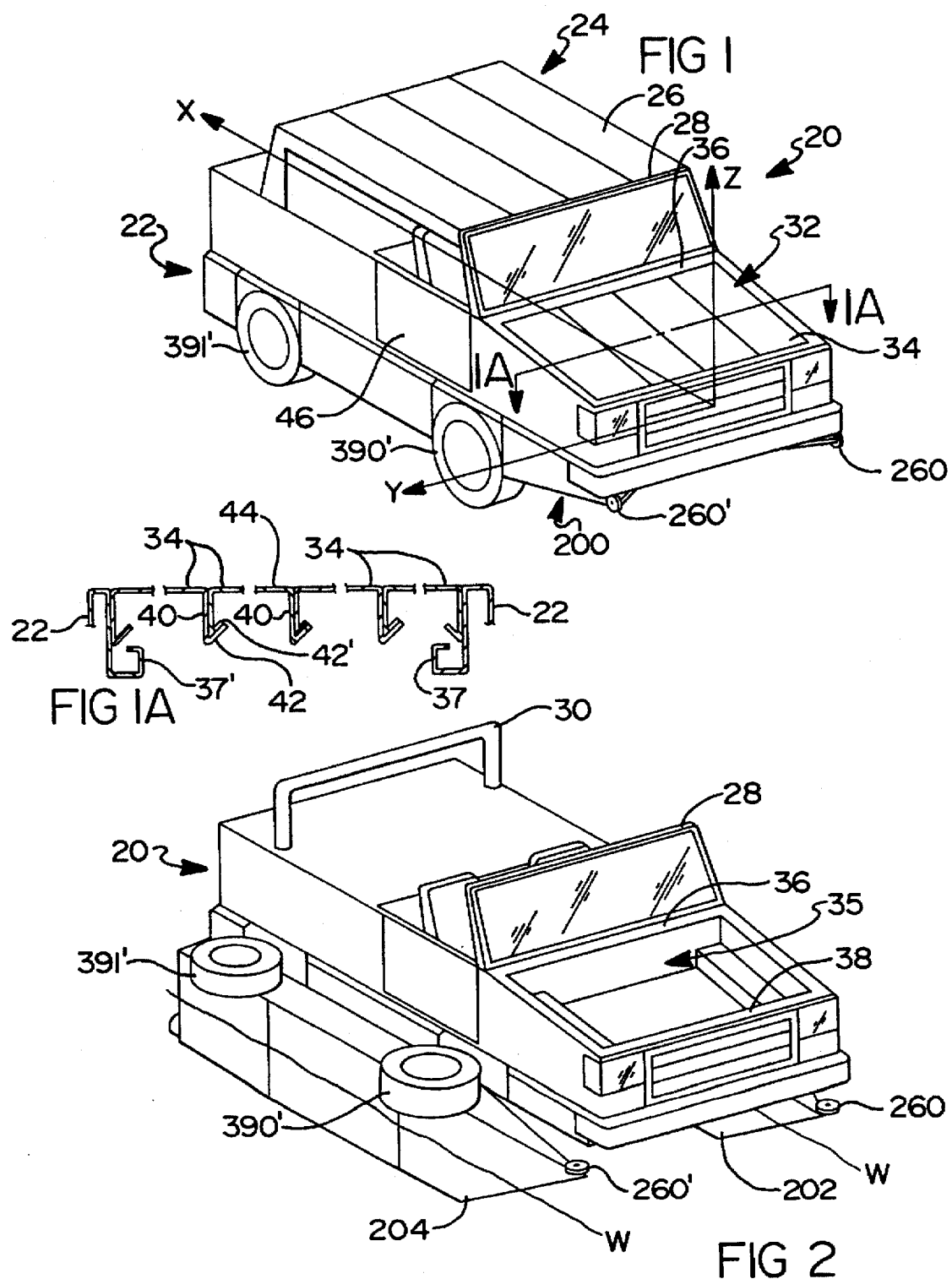

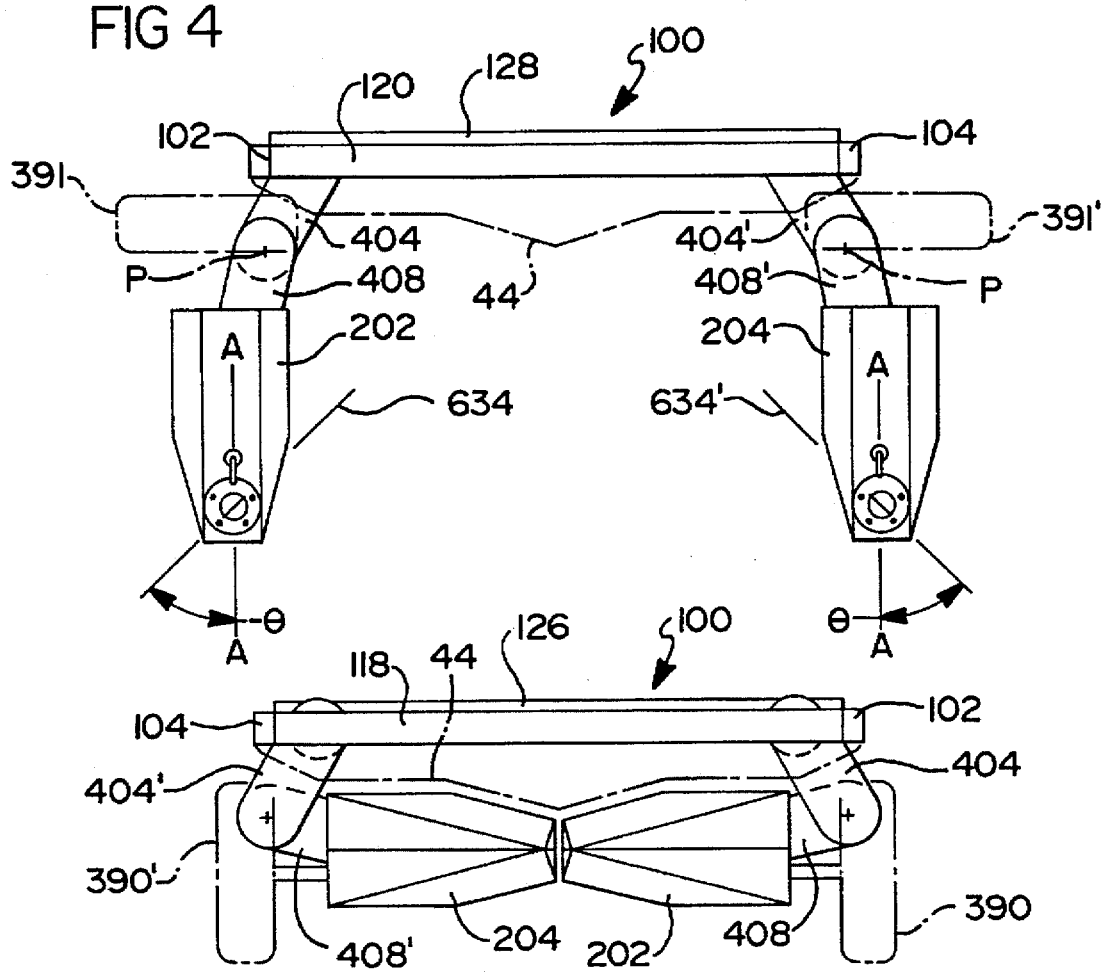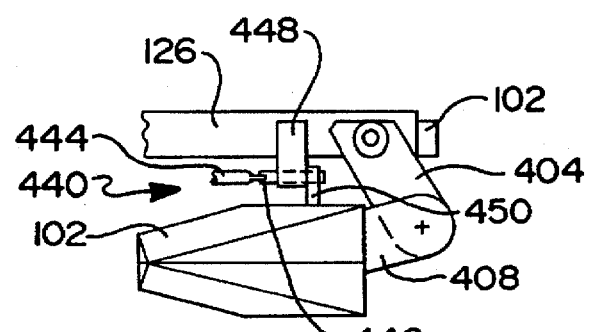

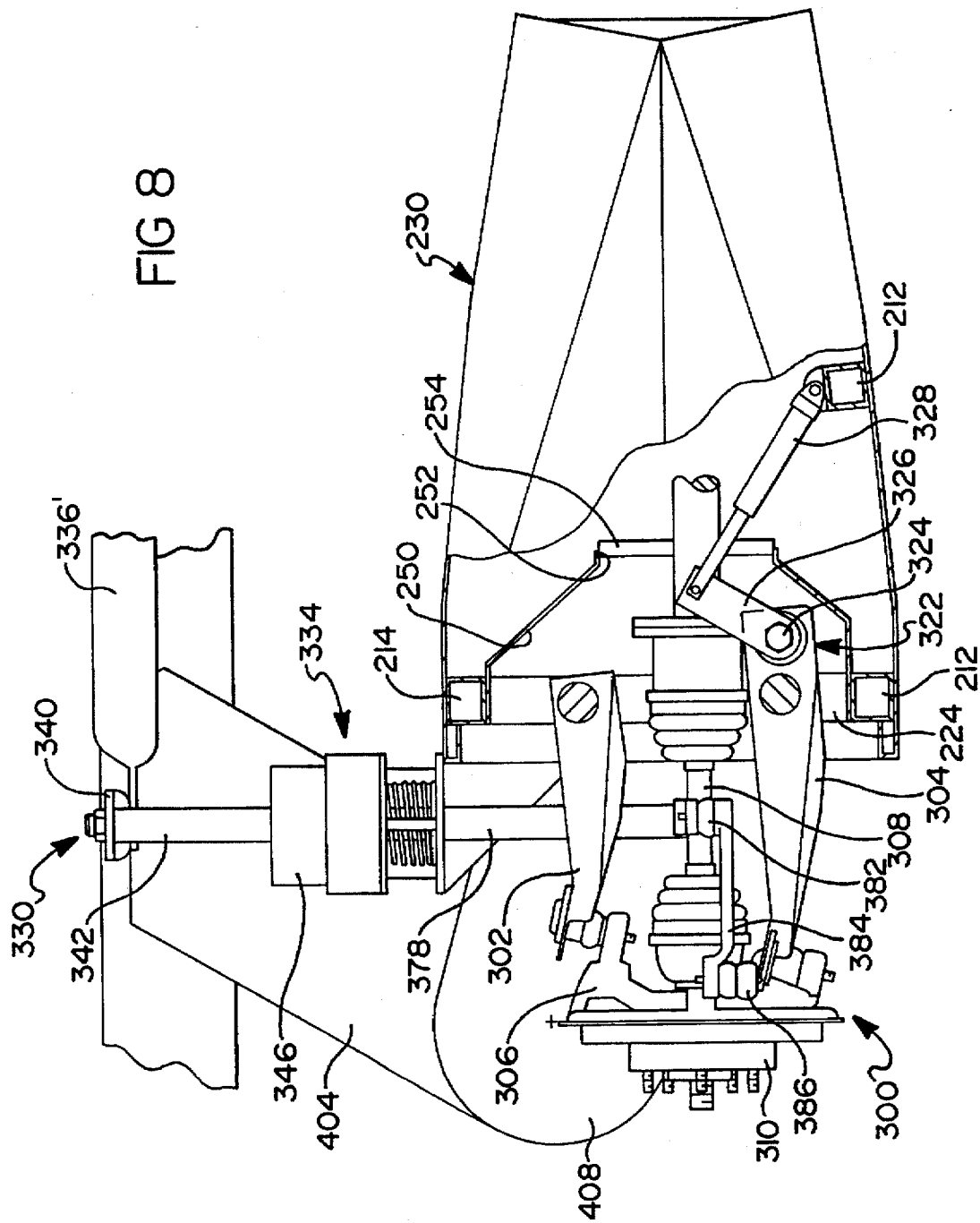

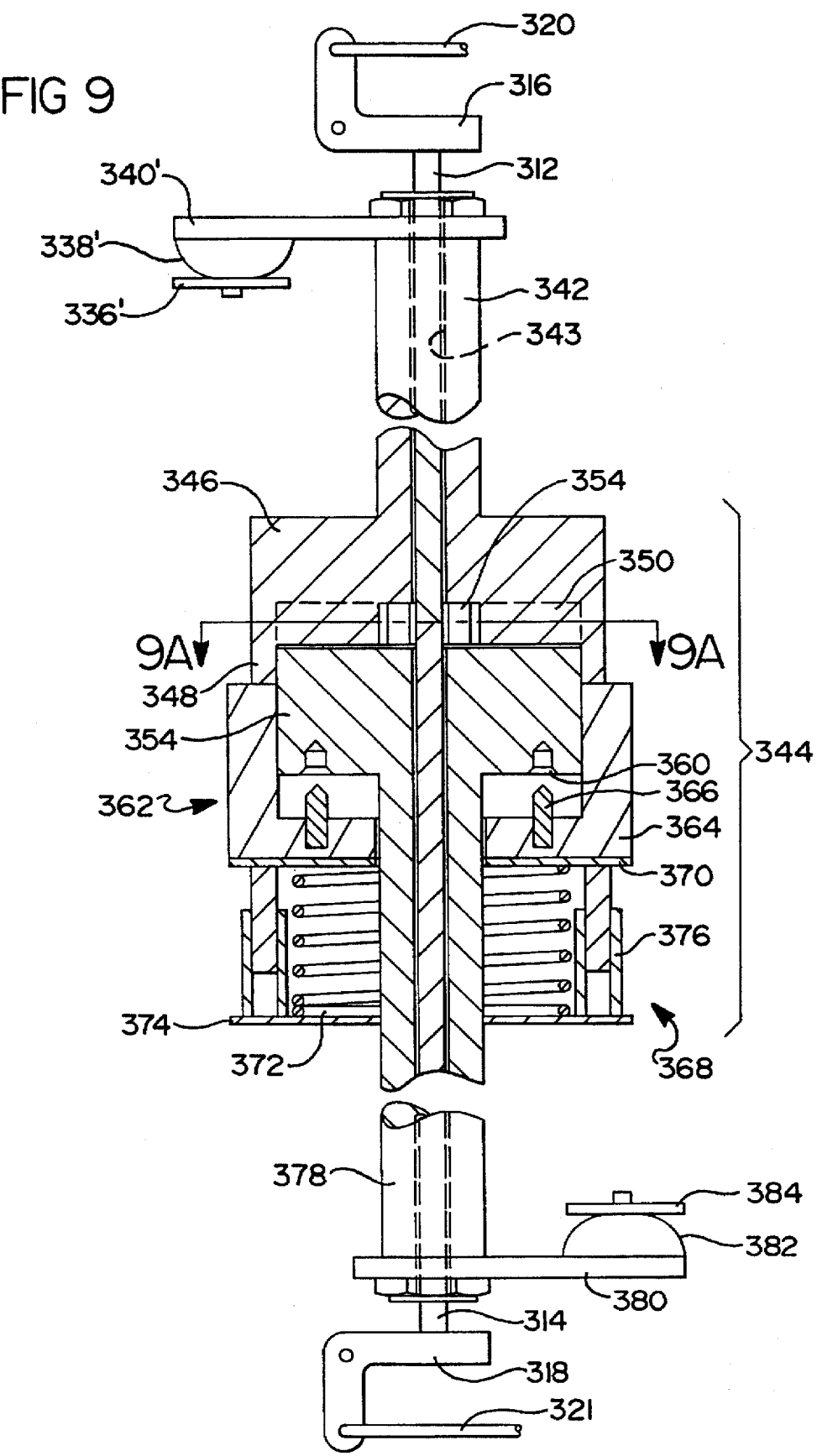

AMPHIBIOUS VEHICLE

BACKGROUND AND SUMMARY OF THE INVENTION

This invention relates generally to amphibious vehicles, and more particularly, to a vehicle having a set of wheels extending from a pair of pontoons which are pivotally coupled to a vehicle frame, such that the pontoons and wheels are positionable between a land use mode wherein the set of wheels are deployed and the pontoons are raised beneath the vehicle for land travel and marine use mode wherein the pontoons are operably deployed and the set of wheels are stowed out of the water for marine travel.

While various examples of amphibious vehicles can be found in the prior art, many of these vehicles are not designed with the true dual mode of operation of an amphibious vehicle in mind. As a result, these prior art vehicles provide neither carlike performance during land use nor boat-like performance during marine use. It is therefore a principal object of the present invention to provide an amphibious vehicle having a pivotally positionable pontoon assembly including a pair of pontoons and a set of wheels for providing proficient land travel and marine travel. It is another object of the present invention to provide a steering system having a mechanical interlock to enable steering of at least two wheels of the amphibious vehicle when in land use mode and to disable the steering of the wheels when in marine use mode. It is a further object of the present invention to provide a drive train system for selectively providing torque to the set of wheels and the marine drive unit. It is still another object of the present invention to provide a jet propulsion unit having a collar assembly for directionally controlling the jet propulsion flow therefrom.

These and other objects and advantages are achieved in an amphibious vehicle having a frame structure, a pontoon assembly including a pair of pontoons and a set of wheels operationally attached to the pontoons, a pivot mechanism pivotally coupling the pontoon assembly to the frame such that the pontoons are positionable between a raised position such that the set of wheels are deployed for providing land travel and a lower position where the pontoons are deployed for providing marine travel, an engine, a jet propulsion unit and a drive train for selectively transmitting torque generated by the engine to the set of wheels for propelling the amphibious vehicle during land use and to the jet drive for propelling the amphibious vehicle during marine use. The amphibious vehicle further includes a mechanical steering interlock for positively connecting and disconnecting the steering of the set of wheel when the pontoon assembly is positioned in the raised and lowered positions, respectively.

BRIEF DESCRIPTION OF THE DRAWINGS

The various advantages of the present invention will become apparent to one skilled in the art by reading the following specification and subjoined claims and by referencing the following drawings in which:

FIG. 1 is a perspective view of the amphibious automobile of the present invention with the pontoons in a raised position beneath the vehicle and the set of wheels operably deployed for land use;

FIG. 1A is a partial cross-section of the interlocking sections which assemble to enclose the hood section of the amphibious vehicle;

FIG. 2 is a perspective view of the amphibious automobile of the present invention with the pontoons in a lowered position and the wheels stowed out of the water for marine use, the roof and hood panels have been removed to illustrate the convertible features of the present invention;

FIG. 3 is a partial front view of the present invention with the pontoons in a raised position as shown in FIG. 1;

FIG. 4 is a partial rear view of the present invention with the pontoons in the lowered position as shown in FIG. 2 and illustrating the jet propulsion nozzle assembly;

FIG. 7A is a cross-sectional view taken along line 7A—7A shown in FIG. 7 showing the pivot shaft assembly in detail;

FIG. 8 is a partial cross sectional view taken through the suspension of the present invention;

FIG. 9 is a partial cross sectional view taken through the steering system of the present invention illustrating the mechanical steering interlock in an engaged condition;

FIG. 11 is a detailed view illustrating the pontoon locking system of the present invention.

DETAILED DESCRIPTION OF THE PREFERRED EMBODIMENT

Figure 5:
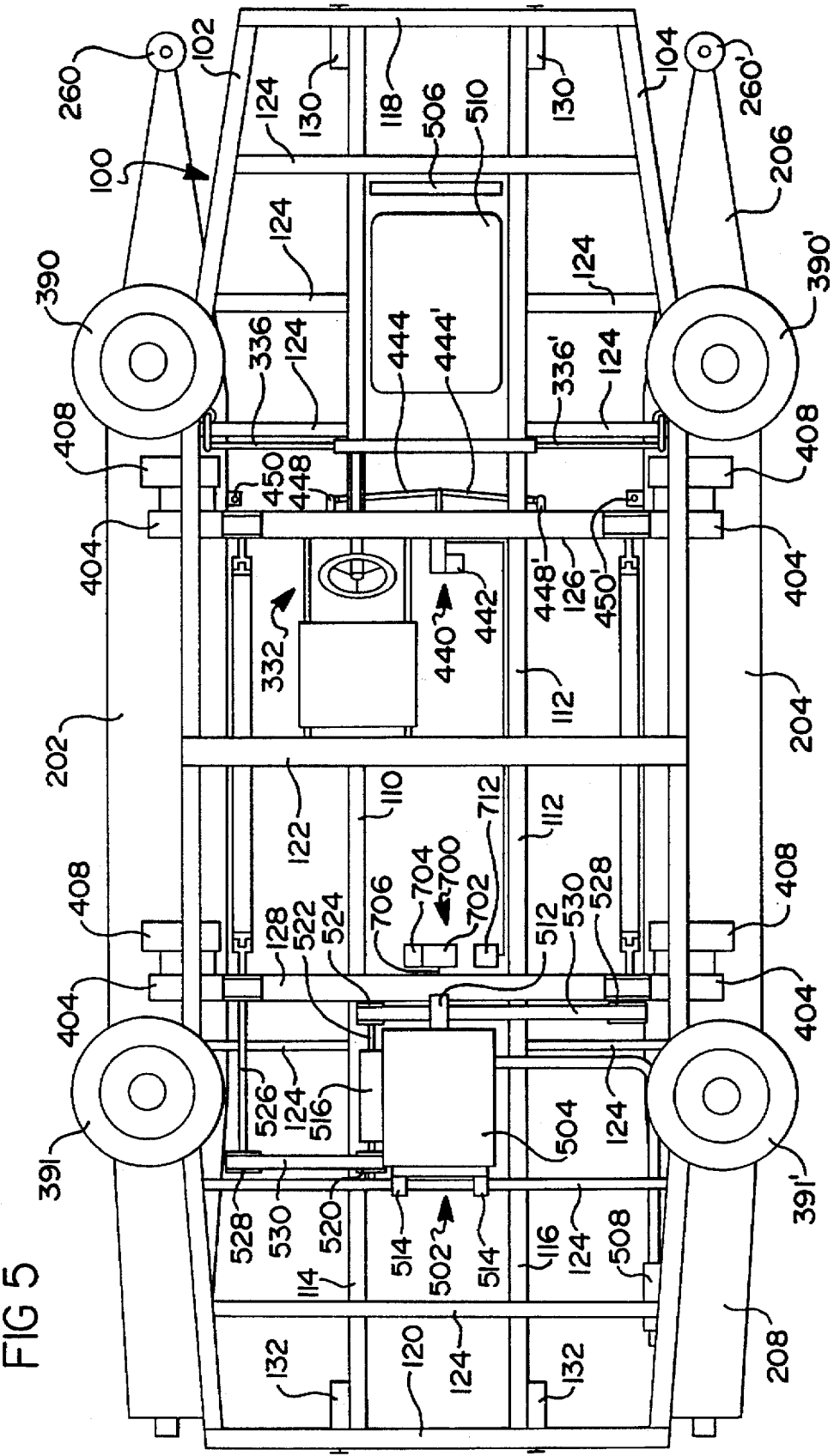
FIG. 5 is a partial plan view of the present invention having the body panels and interior components removed and illustrating the frame structure of the present invention.

As shown in FIGS. 1 and 3, amphibious vehicle 20 according to the present invention is shown in a land use mode wherein pontoon assembly 200 is stowed beneath vehicle frame structure 100 and a set of wheels including front wheels 390, 390' and rear wheels 391, 391' are deployed for providing land travel. As shown in FIGS. 2 and 4, amphibious vehicle 20 is shown with the set of wheels stowed above water line W—W and left and right pontoons 202, 204 deployed for providing marine travel. Throughout the specification, reference will be made to various axes of the vehicle, accordingly, the following coordinate system is adapted herein: the longitudinal axis, which indicated as the X-axis in FIG. 1, extends from the front of the vehicle to the rear of the vehicle with rotation about the longitudinal axis being referred to as roll; the lateral axis, indicated as the Y-axis in FIG. 1, which extends from the center line to side of the vehicle with rotation about the lateral axis being referred to as pitch; and the vertical axis, which extends from the bottom to the top of the vehicle with rotation about the vertical axis being referred to as yaw. The above-described coordinate system is used in reference to a relationship to the overall vehicle coordinate system; however, deviations from this reference may be made for certain "local" coordinate systems defining specific components of the amphibious vehicle herein disclosed. In addition, since many of the components located on the left and right side of amphibious vehicle 20 are identical or mirror images of each other, primed reference numerals are used in some instances to denoted similar elements located on the right-hand side of the vehicle.

With reference to the figures, amphibious vehicle 20 of the present invention includes body 22 secured to and supported by frame structure 100. Pontoon assembly 200 having suspension system 300 with front and rear wheels 390, 390', 391, 391' operably extending therefrom is pivotally coupled to frame structure 100 by pivot mechanism 400 which enables pontoon assembly 200 to be pivotally positioned between a raised position as shown in FIG. 1 and a lowered position as shown in FIG. 2. Powertrain system 500 is supported by frame structure 100 and selectively propels wheels 390, 390', 391, 391' and marine drive unit 600.

The present invention employs a significant number of production vehicle and marine components to facilitate and expedite the assembly thereof. For example, the engine and transmission of a production car, including the electronics, throttle and transmission control systems, engine cooling and fuel systems may be employed in the present invention. Similarly, the safety-related components, such as the headlights, taillights, turn indicators, windshield wiper systems, and bumper impact absorbers, may also be utilized in the present invention. To this end, the present invention contemplates a vehicle which may be fully certified and approved for on-road travel.

Body 22 encloses the mechanical components of amphibious vehicle 20 and providing protection of the vehicle occupants from the elements. As illustrated in FIG. 1, the present invention includes removable roof panel assembly 24 and removable hood panel assembly 32. With respect to roof panel assembly 24, a plurality of roof sections 26 extend longitudinally rearwardly from the windshield header 28 to the rear roll bar 30 and are detachably secured thereto. Rear roll bar 30 further provides additional stiffness to amphibious vehicle 20 and added safety in the event of a rollover accident. Similarly, a plurality of hood sections 34 are supported by support frame 35 defining an opening formed in vehicle body 22, extend longitudinally from windshield cowl 36 to radiator support assembly 38 and are detachably secured thereto. Support frame 35 includes windshield cowl 36, right and left drain gutters 37, 37' and radiator support assembly 38. Referring now to FIG. 1A, hood sections 34 include downwardly extending flange portions 40, 40' terminating at V-shaped drain channel 42, 42' and top portion 44. Adjacent hood sections 34 are interconnected by positioning adjacent downwardly extending flanges 40, 40' together such that adjacent V-shaped drain channels 42, 42' interlock to form hood panel assembly 32. Each of the V-shaped drain channels terminate at a laterally extending drain gutter (not shown) but similar to right and left drain gutters 37, 37'which directs water to the underbody of amphibious vehicle 20. A similar interlocking panel assembly is employed for removable roof panel assembly 24 to permit draining of water impinging thereon. As seen in FIG. 2, roof panel assembly 24 may be detached from amphibious vehicle 20 and stowed therein to provide a open top vehicle. Likewise, hood panel assembly 32 may be detached from amphibious vehicle 20 and stowed therein to provide a bow riding vehicle during marine use.

Body 22 further includes floor pan 44 for providing a water tight seal of the underbody of amphibious vehicle 20. As best seen in FIGS. 3 and 4, floor pan 44 is contoured in a stepped V-shape to reduce the frictional drag generated by the water and provide buoyancy in addition to pontoons 202, 204 during marine use. Furthermore, floor pan 44 is contoured so that pontoons 202, 204 may be stowed beneath amphibious vehicle 20. Other features of body 22 includes aircraft-style doors 46 which are hinged along the lower longitudinal edge of amphibious vehicle 20 and thus fold downward to facilitate access into amphibious vehicle 20. Steps (not shown) may be disposed on the interior surface of doors 46 to further facilitate ingress and egress to amphibious vehicle 20 when door 46 is folded downwardly. Otherwise, body 22 of amphibious vehicle 20 is functionally the same as those associated with a production automobile. Likewise, the interior of amphibious vehicle 20 is equipped in a manner similar to a production automobile with seats, instrument panel, gauges, engine and transmission controls, etc.

Frame Structure

Turning now to FIG. 5, frame structure 100 is generally rectangular in shape and includes a number of longitudinally and laterally extending rails which support various components of amphibious vehicle 20. Main longitudinal frame rails 102, 104 generally extend the length of amphibious vehicle 20 and are laterally spaced apart by front and rear cross rails 118, 120. As best seen in FIG. 5, the front and rear portions of main longitudinal frame rails taper inwardly at an angle approximately equal to the front and rear taper formed on pontoons 202, 204. Mid cross rail 122 and front and rear pivot mechanism support cross rails 126, 128 extend laterally between longitudinal frame rails 102, 104 and are disposed between front and rear cross rails 118, 120. Various longitudinally and laterally extending rails are situated within frame structure 100 to further provide support for various components.

For example, front inboard frame rails 106, 108 extend between front cross rail 118 and front pivot mechanism support cross rail 126. Bumper impact absorber 130 are disposed on the forward ends of inboard frame rails 106, 108. Likewise, intermediate cross rails 124 extend laterally between main longitudinal frame rails 102, 104 and front inboard frame rails 106, 108. In the rear of the vehicle, rear inboard frame rails 114, 116 extend longitudinally between rear pivot mechanism support cross rail 128 and rear cross rail 120. Bumper impact absorbers 132 are disposed on the rearward ends of rear inboard frame rails 114, 116. Intermediate cross rails 124 extend laterally between main longitudinal frame rails 102, 104 and rear inboard frame rails 114, 116. Mid inboard frame rails 110, 112 extend longitudinally between front pivot mechanism support cross rail 126, mid cross rail 122 and rear pivot mechanism support cross rail 128. While frame structure 100 has been described above as a generally rectangular support structure, it should be appreciated that a frame structure which provides adequate structure and support for the necessary components of amphibious vehicle 20 as hereafter described may be provided without deviating from the scope of the invention herein.

Pontoon Assembly

Pontoon assembly 200 includes left pontoon 202 and right pontoon 204 supported from vehicle frame structure 100 for pivotal motion as heretofore described. In this regard, portions 202, 204 have a height to width aspect ratio which enables pontoons 202, 204 to be efficiently stowed beneath the vehicle during land use while providing sufficient volume to achieve the necessary buoyancy required to float amphibious vehicle 20. Furthermore, it is believed that the high aspect ratio reduces the wetted area of the amphibious vehicle 20 at planing speeds, thus reducing the drag generated by amphibious vehicle 20. As presently preferred, pontoons 202, 204 have an aspect ration (taking into account the longitudinal and vertical tapering of the pontoon) of approximately two and one-half to one (2.5:1).

As can be readily appreciated from the figures, left and right pontoons 202, 204 are mirror images of one another.

Figure 7:
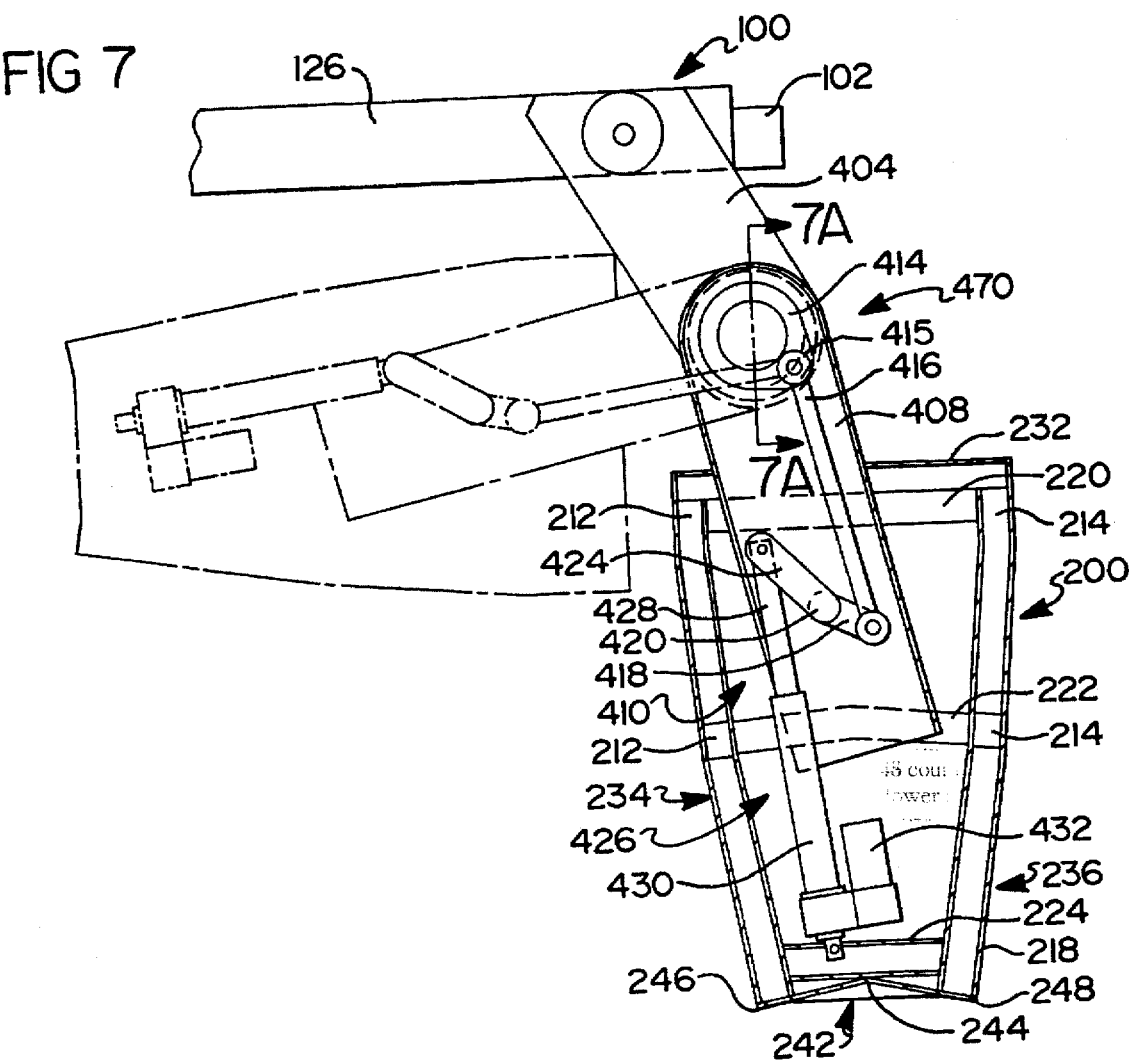
FIG. 7 is a partial cross sectional view taken through the pivot mechanism of the present invention.

Accordingly, only the details of right pontoon 204 are described. As best seen in FIG. 5, pontoon 204 is generally tapered at a from portion 206 and a rear portion 208, and is constructed by providing skin or outer surface 230 disposed over and supported by pontoon frame structure 210. As best seen in FIGS. 7 and 8, pontoon frame structure 210 includes inboard and outboard longitudinal frame members 212, 214, inboard and outboard vertical frame members 216, 218 and upper, mid and lower lateral frame members 220, 222, 224 to provide a frame structure upon which outer surface 230 is attached. Internal bulkheads may be attached to vertical frame members 216, 218 and lateral frame members 220, 222, 224 to partition the interior of pontoon 204. Outer surface 230 of pontoon 204 defines an enclosed volume which provides buoyancy for amphibious vehicle 20. Outer surface 230 includes top surface 232, inboard and outboard sidewall 234, 236 and bottom surface 242. Inboard and outboard sidewalls 234, 236 meet to form a leading edge 238 at the forwardmost portion of pontoon 204. Similarly, inboard and outboard sidewall 234, 236 taper at rear portion 208 and terminate at rear surface 240 which is generally rectangular in shape.

As best seen in FIG. 8, top surface 232 of left pontoon 202 includes pocket 250 formed therein for receiving suspension system 300, such that the suspension system 300 is operably coupled to and extends from pontoon assembly 200 as described hereafter. Aperture 252 is formed in pocket 250 to provide access to a portion of powertrain system 500 disposed within left pontoon 202. Gasket 254 is disposed over aperture 252 to provide a water tight seal for the interior of pontoon 202, while allowing drive axle assembly 308 and height adjustment actuator 328 to extend therethrough.

As presently preferred, left and right pontoons 202, 204 are hydrodynamically shaped to provide adequate buoyancy for amphibious vehicle 20 and to facilitate planing of the vehicle during marine travel. To this end, the bottom portion of the pontoons 202, 204 generally include a concaved portion to define a tunnel-shaped bottom. As best seen in FIG. 7, the bottom portions of inboard and outboard sidewalls 234, 236 extend generally downward and slightly inward towards one another. With bottom surface 242 being shaped such that mid line 244 is vertically above outer edge 246 and 248. By incorporating a tunnel-shaped bottom into right and left pontoons 202, 204, a hydroplaning effect is created which reduces the drag acting on pontoons 202, 204 and creates lift to counterbalance the weight of amphibious vehicle 20 and improve the planing characteristics and the speed of travel of the amphibious vehicle during marine use. While the figures illustrate a generally W-shaped bottom, any shape having a concaved bottom portion could be employed in the present invention.

Pontoon frame structure 21 0 further provides a location for attaching other components of amphibious vehicle 20 to pontoon assembly 200. As illustrated in FIGS. 1 and 2, pontoon wheel 260 is disposed near leading edge 238 of pontoons 202, 204 to prevent pontoon assembly from dragging when amphibious vehicle 20 enters and exits the water. Likewise, as best seen in FIG. 7, pontoon frame structure 210 is interconnected to frame structure 100 through pivot mechanism 400.

Suspension And Steering System

With reference to FIGS. 5 and 8–10, suspension system 300 provides means for operably coupling wheels 390, 390', 391, 391' to pontoons 202, 204 and steering system 330 provides means for directionally controlling the movement of amphibious vehicle 20 during land use. Turning now to FIG. 8, suspension system 300 is a conventional short-long arm suspension system which is operably connected to pontoon frame structure 210 and supported therefrom by a pair of upper lateral frame members 224, one of which is not shown in the cross-section view of FIG. 8.

Suspension system 300 includes upper control arm assembly 302 having a generally A-shaped upper control arm which is pivotally supported by bushings to pontoon frame structure 210 at one end. Similarly, lower control arm assembly 304 a generally A-shaped control arm which is pivotally supported by bushings to pontoon frame structure 210. A pair of ball joints are disposed on the ends of upper and lower control arm assembly 302, 304 opposite the rotationally coupled ends and are operably connected to knuckle assembly 306. The axes of the upper and lower ball joints define a generally vertical steering axis about which knuckle assembly 306 rotates for providing steering control of the wheels.

Suspension system 300 further includes drive axle assembly 308 for transferring torque from powertrain system 500 to wheel 390 and includes a pair of constant velocity (CV) joints and a spindle upon which hub and brake assembly 310 is disposed. Wheel 390 is secured to the lugs of hub and brake assembly 310 and include wheel rims having tires (not shown) mounted thereto. Torsion bar assembly 322 provides a spring biasing force to react the weight of amphibious vehicle 20, and includes torsion bar 324 which is coupled to lower control arm assembly 304 at one end and pontoon frame structure 210 at the opposite end.

Height adjustment link 326 and height adjustment actuator 328 enable the ride height of amphibious vehicle 20 to be adjusted. By rotatably positioning height adjustment link 326 with actuator 328 to rotate torsion bar 324, a height adjustment of suspension system 300 can be effectuated without changing the spring preload or spring constant of torsion bar 324. For example, as height adjustment actuator 328 is shortened, height adjustment link 326 rotates in the clockwise direction, as seen in FIG. 8 to lower the ride height of amphibious vehicle 20 relative to the ground. Conversely, by extending height adjustment actuator 328, height adjustment link 326 is rotated in a counterclockwise direction to raise the ride height of amphibious vehicle 20 relative to the ground.

As can be appreciated from the above description, suspension system 300 operates to suspend the amphibious vehicle on its wheels in a manner well known in the art to provide additional riding comfort and driving safety.

With reference again to FIGS. 5 and 8–10, steering system 330 provides steering control of the front wheels of amphibious vehicle 20 and includes steering wheel assembly 332 having a wheel and input shaft connected to rack 334 supported on front inboard frame rails 106, 108, having upper tie rod 336, 336' extending laterally therefrom. Steering system 330 operates in a conventional manner in that rotation of steering wheel assembly 332 results in a corresponding lateral translation of upper tie rods 336, 336'. Steering system 330 further includes a steering interlock 344 which enables wheel 390, 390' to be controlled when pontoon assembly 200 is in the raised position, while also locking out the steering capabilities of wheels 390, 390' when pontoon assembly 200 is in the lowered position.

The outboard end of upper tie rod 336, 336' is coupled to a rear end of upper pitman arm 340 via upper ball joint 338. The front end of upper pitman arm 340 is secured to an upper end of upper drop shaft 342. Steering interlock 344 is interdisposed between the lower portion of upper drop shaft 342 and the upper portion of lower drop shaft 378. The lower portion of lower drop shaft 378 is secured to a rear portion of lower pitman arm 380. The front portion of lower pitman arm 380 is coupled to lower tie rod 384 via lower ball joint 382. The outboard end of lower tie rod 384 is operably coupled to steering arm 386 formed on knuckle assembly 306.

Steering interlock 344 provides means for interconnecting upper drop shaft 342 with lower drop shaft 378 such that rotational movement of upper drop shaft 342 is transmitted through lower drop shaft 378. Thus, steering system 330 operates whereby a rotary input of the steering wheel causes lateral movement of upper tie rod 336. Upper pitman arm 340 converts lateral movement of upper tie rod 336 into rotational movement of upper drop shaft 342 about a vertical axis. Steering interlock 344 transmits the rotation of upper drop shaft 342 through to lower drop shaft 378. Lower pitman arm 380 converts the rotational movement of lower drop shaft 378 into generally lateral movement of lower tie rod 384 which in turn rotates knuckle assembly 306 of the front wheels 390, 390' about the steering axis defined by the ball joints associated with upper and lower control arm assemblies 302, 304 of suspension system 300.

Steering system 330 of the present invention may also be adapted to provide steering control of rear wheels 391, 391' in addition to front wheels 390, 390'. In this regard, suspension system 300 associated with rear wheels 391, 391' is substantially identical to that of front wheels 390, 390' and steering system 330 provides means for interconnecting upper tie rod end 336 to a rear upper pitman arm associated with rear wheels 391, 391'. In one embodiment, a direct mechanical link is provided between the right upper tie rod and the left rear upper pitman arm. Similarly, a direct mechanical link is provided between the left upper tie rod end and the right rear upper pitman arm. In this manner, a steering input from steering wheel assembly 332 which would turn the front wheels in a counterclockwise direction would also turn the rear wheels in a clockwise direction, and visa versa. It is desirable to provide different steering ratios for the rear wheels as compared with the steering ratio for the front wheels. This may be accomplished by modifying the length of the upper and lower pitman arms associated with the rear steering system. For example, by shortening the length of the rear pitman arms in relation to those associated with the front wheels, the amount of steering applied to the rear wheels will be proportionally less than applied to the front wheels. While the above-described steering system is one means of providing four wheel steering, other well-known means may be readily adapted into amphibious vehicle 20 to afford more precise directional control of amphibious vehicle 20.

Figure 9A:
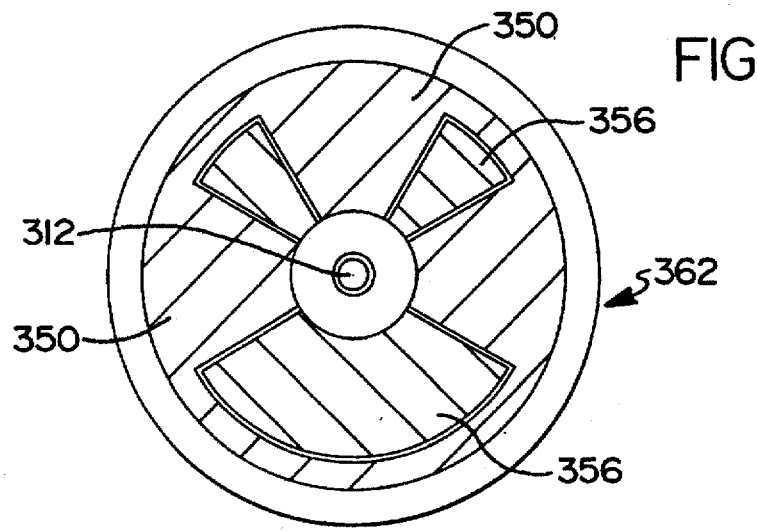
FIG. 9A is a cross sectional view taken through the interlock assembly along line 9A—9A shown in FIG. 9 illustrating the intermeshing collar and hub.
Figure 10:
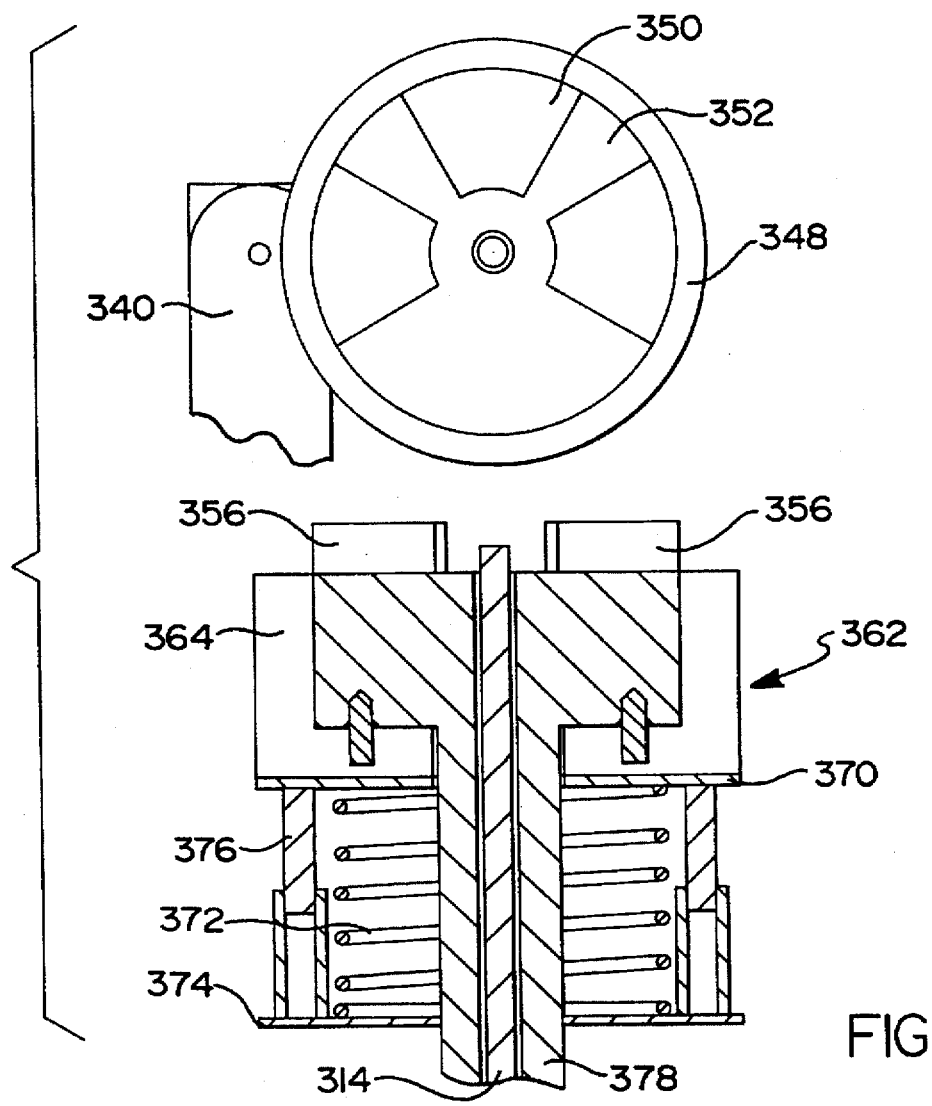
FIG. 10 is a partial cross sectional view similar to FIG. 9 illustrating the steering mechanical interlock in a disengaged condition.

Referring now to FIGS. 9–10, steering interlock 344 generally includes collar 346 disposed on a lower end of upper drop shaft 342 which intermeshing engages hub 354 disposed on an upper end of lower drop shaft 378. Collar 346 is generally cylindrical in shape and includes annular skirt 348 extending from a bottom portion thereof. A plurality of teeth 350 project longitudinal downward from a bottom surface of collar 346 with the sides of adjacent teeth 350 defining recesses 352 therebetween. Similarly, hub 354 is generally cylindrical in shape and includes a plurality of teeth 356 disposed on an upper surface of hub 354 and project longitudinally upward therefrom which are complimentary in shape to teeth 350. Hub 354 is received within and surrounded by annular skirt 348 such that collar teeth 350 extend downwardly into hub recesses 358 and hub teeth 356 extend upwardly into collar recesses 352 to intermeshingly engage one another. As best seen in FIG. 9A, collar teeth 350 and hub teeth 356 are asymmetrically configured such that collar 346 intermeshing engages hub 354 at one and only one angular position.

Steering interlocking 344 further includes locking member 362 and spring assembly 368 concentrically located about the upper portion of lower drop shaft 378 and selectively engageable with hub 354 to prevent rotation of lower drop shaft 378. More specifically, locking member 362 includes annular side wall 364 concentrically located around hub 354. Pins 366 extend upwardly from the interior bottom portion of locking member 362. Hub 354 includes bore 360 on a bottom surface opposite teeth 356 for receiving pin 366. Spring assembly 368 acts to upwardly bias locking member 362 towards hub 354 and includes moveable upper spring seat 370 secured to locking member 362, coil spring 372 and fixed lower spring seat 374 supported from pontoon frame structure 210. Spring assembly 368 further includes spring guide 376 for guiding the reciprocating motion of locking member 362 between a locked position where pin 366 is received in bore 360 and an unlocked position where pin 366 is extracted from bore 360.

As illustrated in FIG. 9, when pontoon assembly 200 is pivoted into the raised position, annular skirt 348 of collar 346 engages side wall 364 of locking member 362 to counteract the upwardly bias of spring 372 causing locking member 362 to slide longitudinally downward and away from hub 354. Pin 366 is extracted from bore 360 of hub 354 allowing lower drop shaft 378 to rotate in connection with upper drop shaft 342. Collar teeth 350 and hub teeth 356 intermeshingly engage one another as heretofore described to provide a mechanical interlock between the upper and lower portions of steering system 330. As best seen in FIG. 10, when pontoon assembly 200 is pivoted into the lowered position, annular skirt 348 of collar 346 disengages side wall 364 and spring assembly 368 acts to upwardly bias locking member 362 towards hub 354. Locking pins 366 are received in bore 360 to prevent rotation of lower drop shaft 378 and corresponding steering movement of wheels 390, 390'.

Referring to FIG. 9, steering interlock 344 of the present invention also provides means for actuating a brake associated with hub and brake assembly 310. Bore 343 is formed through upper drop shaft 342 for receiving upper brake pin 312 to reciprocate therein. Similarly, bore 379 is formed through lower drop shaft 378 for receiving lower brake pin 314 to reciprocate therein. Upper and lower brake pins 312, 314 align in an end-to-end relationship when pontoon assembly 200 is in the lowered position.

Upper brake rocker arm 316 is pivotally coupled to frame structure 100 to convert tension generated by brake lever cable 320 when the parking brake lever (not shown) is engaged into reciprocating motion of upper brake pin 312 within upper drop shaft 342. Upper brake rocker arm 316 includes a first leg portion connected to brake lever cable 320 and a second leg portions abutting upper brake pin 312. Similarly, lower brake rocker arm 318 is pivotally coupled to pontoon assembly 200 to convert reciprocating motion of lower brake pin 314 within lower drop shaft 378 into tensioning of brake assembly cable 321. As presently preferred, amphibious vehicle 20 also is provided with a hydraulic brake system similar to that utilized in an automobile which includes a brake master cylinder coupled to a disc brake system or drum and shoe brake system by hydraulic lines which may be disposed within pivot mechanism 400. In this manner, the present invention affords hydraulic brake actuation for vehicle control and mechanical brake actuation for emergency situations.

Pivot Mechanism

Referring now to FIGS. 5, 7 and 7A, pivot mechanism 400 enables pontoon assembly 200 to be pivotally positionable relative to vehicle frame structure 100 about longitudinal pivot axis P between a raised position for land use and a lowered position for marine use. As best seen in FIG. 5, pivot mechanism 400 includes four similar pivot mechanisms interconnected between frame structure 100 and pontoon assembly 200 at a middle portion of amphibious vehicle 20. Accordingly, a description will be provided for one assembly, the other assemblies being identical or mirror images thereof. As best seen in FIGS. 7 and 7A, pivot mechanism 400 generally includes frame support arm 404 secured to front and rear pivot mechanism support cross rails 126, 128 of frame structure 100 and pontoon support arm 408 secured to pontoon assembly 200 with pivot shaft assembly 470 extending between and interconnecting support arms 404, 408. Pontoon positioning mechanism 410 is disposed in pontoon 202 and is coupled to pivot shaft assembly 470 to position pontoon assembly 200 between the raised and lowered position. Furthermore, drive shaft bearing assembly 460 rotatably supports pivot drive shaft 536 within pivot shaft assembly 470. Referring to FIG. 11, pivot mechanism 400 also includes locking mechanism 440 which enables pontoon assembly 200 to be mechanically locked in the raised position, thereby preventing unintended positioning of pontoon assembly 200 during land use.

With continued reference to FIG. 7, tubular frame support arm 404 is generally rectangular in cross section having a first end fixedly secured to pivot mechanism support cross rail 126 and extends generally vertically downwardly and laterally outwardly therefrom. Similarly, tubular pontoon support arm 408 is generally rectangular in cross section having a lower end secured to pontoon frame structure 210 and extending generally vertically upwardly therefrom.

Pivot shaft assembly 470 interconnects frame support arm 404 and pontoon support arm 408 to permit relative rotation therebetween. Referring now to FIG. 7A, pivot shaft inner race 474 is generally cylindrical having one end secured to frame support arm 404 and extending concentrically about pivot drive shaft 536. Pivot shaft outer race 478 is generally cylindrical having one end secured to pontoon support arm 408 and extending concentrically about pivot shaft inner race 474. Pivot shaft bushing 476 is generally cylindrical and interdisposed between pivot shaft inner and outer races 474, 478 to facilitate rotation of pontoon support arm 408 relative to frame support arm 404. Pivot shaft cover 472 is also secured at one end to pontoon support arm 408 and extends concentrically about pivot shaft outer race 476 to protect pivot shaft assembly 470 from water and dirt. Retainer ring 480 is disposed on the end of pivot shaft inner race 474 opposite frame support arm 404 to secure pivot shaft assembly 470 relative to frame and pontoon support arms 404, 408.

A pair of drive shaft bearing assemblies 460 journally support pivot drive shaft 536 within pivot shaft assembly 470. More specifically, each drive shaft bearing assembly 460 includes inner drive shaft inner race 462 concentrically located about pivot drive shaft 536 and held in place by retainer rings 468, drive shaft outer race 464 secured to an inner wall of pivot shaft inner race 474. Drive shaft bearing 466 is disposed between drive shaft inner and outer races 462, 464 to facilitate rotation of pivot drive shaft 536 within pivot shaft assembly 470.

Figure 6:
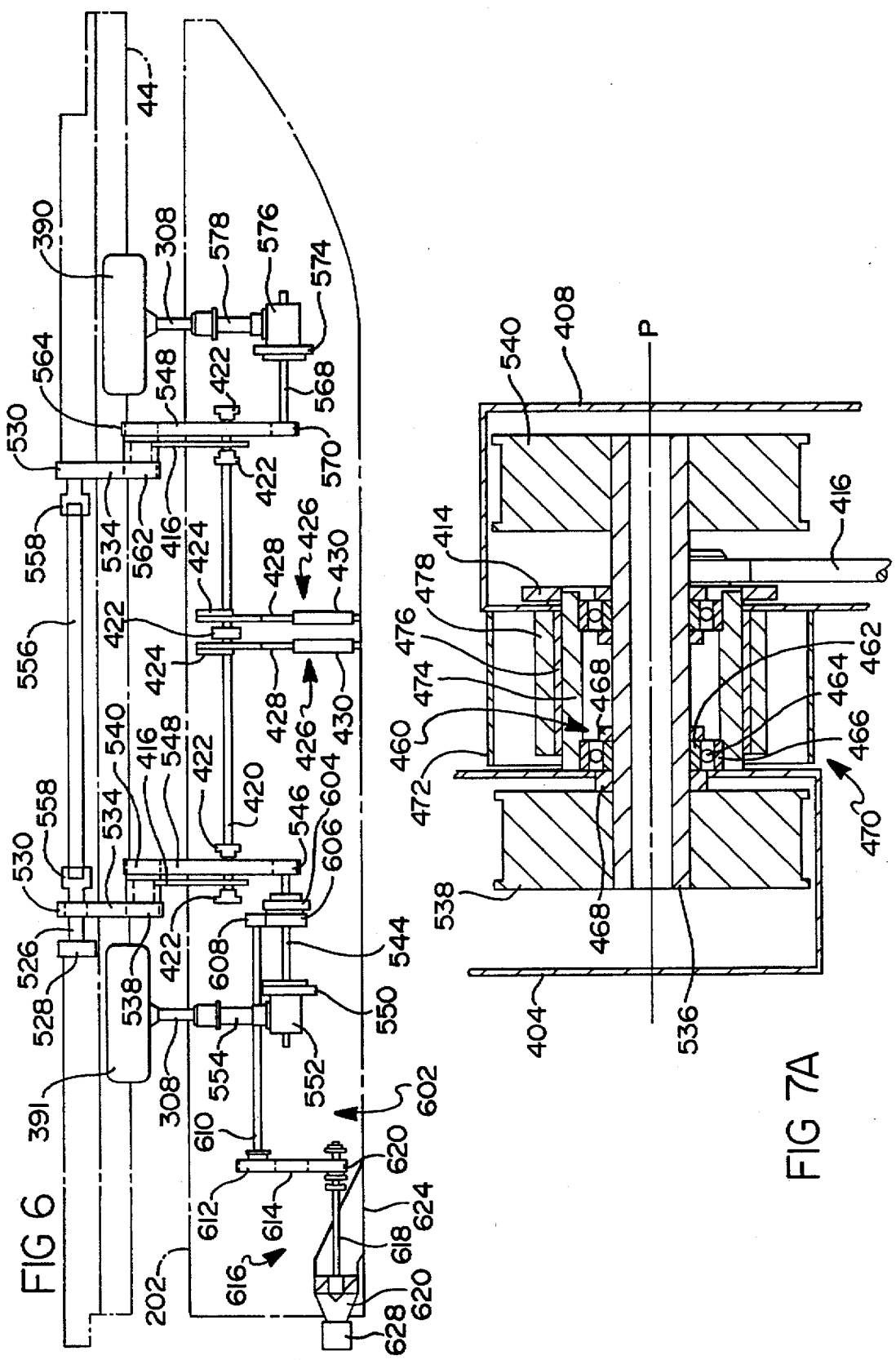
FIG. 6 is a partial side view illustrating the pivot mechanism and drive train of the present invention.

Referring now to FIGS. 6 and 7, pontoon positioning mechanism 410 includes linkage assembly 412 operably interconnecting linear actuator 426 to pivot shaft assembly 470 for pivotally positioning pontoon assembly 200. Linkage assembly 412 includes actuator ring 414 disposed on the end of pivot shaft inner race 474 opposite frame support arm 404 for coupling with pivot positioning mechanism 410 to rotate pontoon assembly 200 relative to frame structure 100. Linear actuator 426 is coupled to actuator ring 414 and cooperates with linkage assembly 412 to pivotal position pontoon assembly 200. As best seen in FIG. 7, connector link 416 is pivotally coupled at a first end to eccentric lobe 415 of actuator ring 414 and extends downward within support arm 408. Connector link 416 is pivotally coupled at the opposite end to a first end of follower link 418 fixedly secured to drive shaft 420 at the opposite end. Referring now to FIG. 6, drive shaft 420 extends longitudinally within pontoon 204 from follower link 418 to drive link 424 and is supported for rotational movement from pontoon frame structure 210 by journal bearings 422. Drive link 424 is fixedly secured at one end to drive shaft 420 and pivotally coupled to an end of actuator rod 428. As presently preferred, electro-mechanical actuator 426 is a screwtype linear actuator and includes actuator rod 428 which is linearly extendable from cylinder 430 between a retracted position and an extended position, by electric screw drive 432. Electrical power for actuator 426 is provided by way of auxiliary battery 712 schematically shown in FIG. 5. Electrical wiring 714 can be fed through rear support cross rail 128 and pivot mechanism 400 into pontoon assembly 200 to provide electrical power to actuator 426. The end of actuator 426 is coupled to pontoon frame structure 210 by way of a pinned connection. It should be readily appreciated that actuator 426 enables pontoon assembly 200 to be positively positioned in any position between the fully raised position and the fully lowered position. While other types of actuators, such as hydraulic actuators may be employed herein, the electromechanical screw drive actuator is presently preferred to prevent undesirable rotation of pontoon assembly 200 should actuator 426 fail.

With continued reference to FIGS. 6 and 7, the operation of pontoon positioning mechanism 410 will now be described. To be placed in the lowered, marine use position as shown in solid lines in FIGS. 7, rod 428 of actuator 426 is fully extended to rotate drive shaft 420 in a clockwise position via drive link 424. The clockwise rotation of drive shaft 420 causes corresponding rotation of follower link 418 in the clockwise direction, thus effectively shortening the distance between pivot point P and the central longitudinal axis of drive shaft 420 causing pontoon assembly 200 to rotate downward in a counterclockwise direction about pivot point P into the lowered position. To place pontoon assembly 200 in the upright position, actuator 426 is activated to retract rod 428 into cylinder 430, thereby causing counterclockwise rotation of drive link 424, drive shaft 420 and follower link 418. The counterclockwise rotation of follower link 418 results in an effective lengthening of the distance between pivot point P and the central longitudinal axis of drive shaft 420, thus rotating pontoon assembly 200 in a clockwise direction about pivot point P into a substantially raised, retracted position, as shown in phantom lines in FIG. 7.

As previously discussed, the use of electric screw-type actuator 426 provides means of mechanically positioning pontoon assembly 200; however, it is presently preferred to also provide locking mechanism 440 to positively lock pontoon assembly 200 into the raised, land use position. As best seen in FIGS. 5 and 11, locking mechanism 440 includes linear actuator 442 secured to front pivot mechanism support cross rail 126 such that the actuator rod is positionable between an extended and a retracted position in the longitudinal direction of amphibious vehicle 20. A pair of drive links 444, 444' are pivotally coupled to the end of the rod opposite the cylinder of actuator 442 and extend laterally outboard. Locking pin 446, 446' is pivotally connected to the end to drive links 444 opposite the rod of actuator 442.

Figure 12:
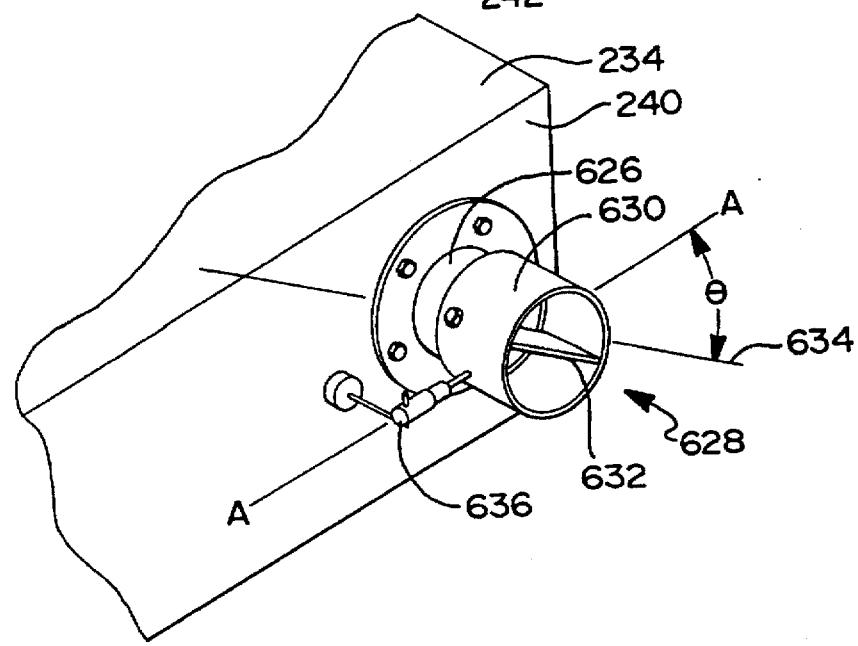
FIG. 12 is a detailed view illustrating the jet propulsion nozzle assembly.

Pin guide 448 is fixedly secured to front pivot support cross rail 126 and has an aperture formed therein for receiving locking pin 446. As seen in FIG. 11, pontoon assembly 200 includes pontoon locking tab 450 extending generally perpendicular from an inboard surface of pontoon assembly 200. Locking tab 450 has an aperture formed therein such that pontoon locking tab 450 aligns with pin guide 448 when pontoon assembly 200 is pivoted into the raised position when the pontoons 202, 204 are in the raised position. Pontoon assembly 200 is mechanically locked by retracting the rod of actuator 442 causing drive links 444 to move locking pins 446 laterally outward, thus extending locking pin 446 into the aperture formed in pontoon locking tab 450 as best seen in FIG. 12. Pontoon assembly 200 is unlocked by extending the rod of actuator 442, thus urging the inboard end of drive link forward and causing locking pin 446 to move lateral inboard, thereby disengaging locking pin 446 from pontoon locking tab 450.

Powertrain System

With reference to FIGS. 5 and 6, powertrain system 500 of amphibious vehicle 20 will now be described. As previously discussed, amphibious vehicle 20 incorporates various standard or carry-over components from production automobiles. In this regard, powertrain system 500 includes engine/transmission assembly 502 for generating torque to drive wheels 390, 390', 391, 391' and marine drive unit 600. Engine/transmission assembly 502 includes engine 504, radiator 506 for cooling engine 504, exhaust system 508 and fuel system 510 supported by and secured to vehicle frame structure 100 in a manner similar to a conventional automobile. Engine 504 is attached to vehicle frame structure 100 by way of front engine mount 512 and rear engine mounts 514. Since engine/transmission assembly 502 has been located in the rear portion of amphibious vehicle 20, fuel tank 510 is positioned in the front portion of amphibious vehicle 20 to balance the weight distribution of amphibious vehicle 20. Similarly, radiator 506 is located in the front of amphibious vehicle 20 to balance the weight distribution and to provide the maximum airflow through radiator 506 to facilitate cooling of engine 504. As presently preferred, engine/transmission assembly 502 is a 2.8 liter fuel injected V6 engine assembly from General Motors which includes all of the "hang ons" including the alternator, air pump, water pump, and power steering pump which are interconnected to their associated components.

Transaxle 516 enables torque generated by engine 504 to be transmitted to the drive line at variable gear ratios. Transaxle 516 also includes a differential mechanism which accommodates the difference in the rotational speed of the left and right wheels as amphibious vehicle 20 is executing a turn. Left transmission output shaft 518 extends from a rear portion of transaxle 516 and is journally supported at the opposite end to intermediate cross rail 124. Left transmission sheave 520 is disposed on left transmission output shaft 518. Similarly, right transmission output shaft 522 extends forwardly from a front portion of transaxle 516 and is journally supported at the opposite end to rear pivot mechanism support cross rail 128. Right transmission sheave 524 is attached to right transmission output shaft 522.

The powertrain of amphibious vehicle 20 which enables the torque generated by engine/transmission assembly 502 to be transmitted through pivot mechanism 400 and selectively applied to wheels 390, 390', 391, 391' and marine drive unit 600 in pontoon assembly 200 includes an upper drive line assembly for transmitting torque from transmission output shaft 518, 522 to pivot mechanism 400, a pivot drive line assembly for transmitting the torque through pivot mechanism 400 and a lower drive line assembly for transmitting torque from pivot mechanism 400 to front wheels 390, 390', rear wheels 391, 391', and marine drive unit 600.

Upper drive line assembly includes upper drive shaft 526 journally supported at an outboard portion of rear pivot mechanism support cross rail 128. Upper drive sheave 528 is secured to a rear end of upper drive shaft 526 for rotation therewith. Upper drive belt 530 interconnects transmission sheave 520, 524 with upper drive sheave 528, 528 respectively. Referring now to FIG. 6 which illustrates only the right side drive line, upper drive sheave 530 is secured on a front end of upper drive shaft 526 and disposed within rear pivot mechanism support cross rail 128.

As heretofore described, the pivot drive line assembly includes pivot drive shaft 536 journally supported within pivot shift assembly 470 for rotation therein. Pivot drive sheave 538 is secured to a rear portion of pivot drive shaft 536 and pivot drive belt 534 interconnects upper drive shaft 526 to pivot drive shaft 536. Pivot drive sheave 540 is secured to a forward portion of pivot drive shaft 536 opposite pivot drive sheave 538.

The lower drive line assembly includes lower drive shaft 544 disposed within pontoon assembly 200 and journally supported from pontoon frame structure 210. Lower drive sheave 546 is secured to a forward portion of lower drive shaft 544. Lower drive belt 548 couples pivot drive shaft 536 via pivot drive sheave 540 to lower drive shaft 544 via lower drive sheave 546. Thus, powertrain system 500 transmits torque generated by engine/transmission assembly 502 from transmission output shaft 522 to upper drive shaft 526 which is located along the main longitudinal frame rails 104 to pivot drive shaft 536 to lower drive shaft 544 disposed within pontoon assembly 200 through the use of a power transmission belt and sheave system as heretofore described. The belt and sheave system utilized is suitably selected based on the speed and torque ranges generated by engine/transmission assembly 502. In this regard, a squared tooth sheave and complimentary drive belt are presently preferred. Furthermore, while other methods of transmitting torque from the engine located on the vehicle frame structure to the pontoon assembly may be utilized, such as gears or drive shafts, the belt and sheave system heretofore described is presently preferred for its flexibility and adaptability into the present invention.

Powertrain system 500 further enables the torque generated by engine/transmission 502 to be selectively transmitted to rear wheels 391, 391' and marine drive unit 600. In this regard, rear wheels 391, 391' are selectively driven by lower drive shaft 544. Rear wheel clutch assembly 550 is operably coupled to lower drive shaft 544 opposite lower drive sheave 546 for selectively transmitting torque to the input of rear wheel gear box 552. An output shaft of rear wheel gear box 552 extends generally perpendicular to lower drive shaft 544 and is connected to drive axle assembly 308. Rear wheel clutch assembly 550 is positionable between a disengaged position whereby torque transmitted to lower drive shaft 544 is not transmitted to the input of rear wheel gear box 552 and an engaged position whereby torque transmitted to lower drive shaft 544 is transmitted to the input shaft of rear wheel gear box 552, thus driving rear wheels 391, 391'.

As presently preferred, rear wheel clutch assembly 550 is hydraulically actuated by an actuator interconnected between pontoon frame structure 210 and a clutch fork associated with rear wheel clutch assembly 550. The actuator is selectively positionable to engage and disengage rear wheel clutch assembly 550. As schematically shown in FIG. 5, hydraulic system 700 includes hydraulic pump 702 and accumulator 704 operably coupled to hydraulic line 706. The hydraulic line 706 are disposed within rear pivot mechanism support cross rail 128 and are fed through pivot shaft assembly 470 into pontoon assembly 200 where they are connected to clutch assembly 550 in addition to clutch assemblies 574 and 604 described hereinafter.

Powertrain system 500 further enables torque generated by engine/transmission 502 to be selectively transmitted to front wheels 390, 390' of amphibious vehicle 20 in a manner similar to the rear drive line as best seen in FIG. 5. More specifically, a rear portion of upper prop shaft 556 is rotatably coupled to a forward portion of upper drive shaft 526. A pair of U-joints 558 are disposed at each end of upper prop shaft 558 to accommodate for rotational misalignment of the ends of upper prop shaft 556. Front upper drive sheave 532 is disposed within and journally supported from front pivot mechanism support cross rail 126 and secured to the forward end of upper prop shaft 556.

Pivot drive line assembly includes front pivot drive shaft 560 journally supported within pivot shift assembly 470 in a manner similar to rear pivot drive shaft 536 heretofore described and front pivot drive sheaves 562 and 564 disposed on either end thereof. Pivot drive belt 534 is interconnected between upper drive sheave 532 and pivot drive sheave 562 for rotatably coupling upper prop shaft 556 with pivot drive shaft 560.

Lower drive line assembly includes lower drive shaft 568 disposed within pontoon assembly 200 and journally supported on pontoon frame structure 210. Lower drive sheave 570 is secured to a rear portion of lower drive shaft 566 and coupled to pivot drive sheave 564 with lower drive belt 548. The front portion of lower drive shaft 568 is selectively coupled to the input of front wheel gear box 576 by front wheel clutch assembly 574. The output shaft of front wheel gear box 576 is rotatably coupled to front wheel axle shaft 578 in a manner similar to that previously described with respect to the rear wheel assembly. From wheel drive is enabled by selectively engaging front clutch assembly 574 to operably couple engine/transmission assembly 502 with front wheels 390, 390'.

As presently preferred, powertrain system 500 provides a one-to-one ratio from transmission output shaft 518, 522 to axle shaft 554, 578. Furthermore, while the preferred embodiment has been described with specific reference to a belt and sheave powertrain system, it should be appreciated that other power transmission mechanisms, such as a chain drive or beveled gear box system, may be employed herein to provide a powertrain system which selectively transmit torque generated by the engine to the front and/or rear wheels, as well as the marine drive unit.

Marine Drive Unit

Referring to FIGS. 6, right pontoon 204 and left pontoon 202 has jet propulsion unit 616, 616' disposed therein for propelling amphibious vehicle 20. Unless otherwise noted, a description of jet propulsion unit 616 is provided, jet propulsion unit 616' being substantially identical thereto. Jet propulsion unit 616 converts the torque applied to impeller 622 into a jet of water used to propel amphibious vehicle 20 through the water. Jet propulsion unit 616 is selectively driven by rear lower drive shaft 544 via jet drive line 602 which includes jet clutch assembly 604 operably coupled to rear lower drive shaft 544 between lower drive sheave 546 and rear wheel clutch assembly 550. Gear 606 is disposed on the driven side of clutch 604 such that gear 606 is rotatably coupled to lower drive shaft 544 when clutch assembly 604 is in an engaged position and gear 606 is uncoupled from lower drive shaft 544 when clutch assembly 604 is in a disengaged position. Furthermore, clutch assembly 604 allows torque to be transmitted therethrough to rear wheel clutch assembly 550 irrespective of its engagement condition. Jet drive line 602 further includes gear 608 disposed on a forward end of crossover shaft 610 which meshingly engages with gear 606 to transmit torque from lower drive shaft 544 to crossover shaft 610 when jet clutch assembly 604 is engaged. Drive sheave 612 is disposed on a rear end of crossover shaft 610 opposite gear 608.

Jet propulsion unit 616 includes jet drive shaft 618 having jet sheave 620 disposed on a forward end thereof and impeller 622 disposed on a rear end thereof. Drive belt 614 rotatably couples crossover shaft 610 with jet drive shaft 618, thus transmitting engine torque to jet propulsion unit 616.

In this manner, when jet drive shaft 618 is selectively driven, impeller 622 rotates causing water to be drawn into jet propulsion unit 616 through intake 624 formed in bottom surface 242 of outer surface 230. As will be readily appreciated, the contoured bottom surface of pontoon 202, 204 channels water towards intake 624 to maximize the volume flow of water thereto. The water flow is accelerated by impeller 622 and discharged out of outlet nozzle 626 as a jet of water.

Collar 628 extends over a portion of outlet nozzle 626 for directionally controlling the jet of water. As best seen in FIGS. 4 and 12, collar 628 includes cylindrical sleeve 630 concentrically located over outlet nozzle 626 to provide directional control of the jet of water emitted from outlet nozzle 626. Pivot 634 couples cylindrical sleeve 630 to outlet nozzle 626 to enable collar 628 to be pivotally positioned relative to outlet nozzle 626. The axis of pivot 634 is oriented off of axis A—A by the angle $\Theta$, as shown in FIG. 12. As presently preferred, pivot 634 is angularly oriented approximately 40° off of axis A—A. Collar 628 further includes baffle 632 disposed within the inner wall of cylindrical sleeve 630. Angularly oriented pivot axis 634 in combination with baffle 632 enables jet propulsion unit to generate a jet of water in vertical and lateral direction. Actuator 636 is operably connected to the outside wall of cylindrical sleeve 630 for pivotally positioning collar 628.

Pivot 634 of right jet propulsion unit 616 and pivot 634' of left jet propulsion unit 616' are equi-angularly displaced in opposite directions relative to reference axis A—A as best seen in FIG. 4. That is to say, pivot axis 634 of left jet propulsion unit 616 is approximately 45° off of axis A—A in a counterclockwise direction and pivot axis 634' of right jet propulsion unit 616' in approximately 45° off of axis A—A in a clockwise direction. The combination of jet propulsion units 616, 616' with angularly-orientated pivot 634, 634' and baffle 632, 632' provides superior directional control of amphibious vehicle 20 regardless of the orientation of pontoon assembly 200. For example, a lateral component of thrust is generated when pontoon assembly 200 is positioned in either the raised or lowered positions for turning the vehicle in the water. Furthermore, the combination of jet propulsion units 616, 616' with angularly-orientated pivot 634, 634' and baffle 632, 632' produces a thrust force which facilitate turning of amphibious vehicle 20 when pontoon assembly 200 is in the lowered position by generating a vertical component of thrust which counteracts the load distribution transfer induced by the turning of the vehicle, in addition to generating a lateral component of thrust which turns the vehicle.

From the foregoing description, those skilled in the art can now appreciate that the present invention provides an amphibious vehicle which is adapted to efficiently travel in a land use mode and a marine use mode and solves many of the mechanical complexities associated therewith. While the present invention has been described in connection with particular examples thereof, it can be implemented in a variety of forms. Therefore, the scope of the invention should not be limited to the particular embodiments described herein, since the true scope of the invention will become apparent to the skilled practitioner upon a study of the drawings, specification and following claims.

What is claimed:

1. An amphibious vehicle comprising:

a frame structure;

a pontoon assembly including a pair of pontoons;

a pivot mechanism coupling said pontoon assembly to said frame structure such that said pair of pontoons are pivotally positionable between a raised position wherein said pair of pontoons are stowed and a lowered position wherein said pair of pontoons are deployed;

a set of wheels supported by said pontoon assembly and extending therefrom such that said set of wheels are operably deployed when said pontoon assembly is positioned in said raised position, and said set of wheels are stowed when said pontoon assembly is in said lowered position;

an engine mounted on said frame structure;

a marine drive unit; and a powertrain for transmitting torque generated by said engine to selectively drive said set of wheels and said marine drive unit.

2. The amphibious vehicle of claim 1, wherein said pontoon assembly is pivotally positionable about a longitudinal axis such that said pair of pontoons are horizontally stowed beneath said frame structure when said pontoon assembly is in said raised position and such that said set of wheels are stowed substantially out of the water above said pontoons when said pontoon assembly is in said lowered position.

3. The amphibious vehicle of claim 1, wherein said pivot mechanism includes a pivot mechanism associated with each of said pair of pontoons, each of said pivot mechanisms comprises:

a frame support arm having a first end secured to an outboard edge of said frame structure;

a pontoon support arm having a first end secured to said pontoon assembly;

a pivot shaft assembly operably coupling said frame support arm and said pontoon support arm; and a pontoon positioning mechanism disposed within each of said pair of pontoons and operably coupled to said pivot shaft assembly to rotatably position said pontoon assembly between said raised position and said lowered position.

4. The amphibious vehicle of claim 3, wherein each of said pivot mechanism further comprises an inner race secured to said frame support arm, an outer race secured to said pontoon support arm and a bushing disposed between said inner and outer races to permit rotation of said pontoon support arm relative to said frame support arm.

5. The amphibious vehicle of claim 4, wherein said pontoon positioning mechanism further comprises:

an actuator having a first end secured to said pontoon assembly and a second end linearly extendable relative to said first end; and a linkage assembly secured to said inner race and operably coupled to said second end of said actuator such that linear extension of said actuator rotatably positions said pontoon assembly relative to said frame structure.

6. The amphibious vehicle of claim 1, wherein said powertrain selectively drives a front set of wheels, a rear set of wheels and said marine drive unit individually or simultaneously in any combination.

7. The amphibious vehicle of claim 1, wherein said powertrain comprises:

an upper drive line assembly supported from said frame structure and operably coupled to said engine to transmit torque generated thereby;

a pivot drive line assembly supported from said pivot mechanism and operably coupled to said upper drive line assembly to transmit torque from said upper drive line assembly through said pivot mechanism; and a lower drive line assembly supported from said pontoon assembly and operably coupled to said pivot drive line assembly to selectively transmit torque from said pivot drive line assembly to said set of wheels and said marine drive unit.

8. The amphibious vehicle of claim 7, wherein said powertrain further comprises:

said upper drive line assembly including a transaxle having a transmission output shaft operably coupled to said engine and an upper driveshaft journally supported from said frame structure at an outboard edge thereof and operably coupled to said transmission output shaft;

said pivot drive line assembly including a pivot driveshaft journally supported from said pivot mechanism and operably coupled to said upper driveshaft; and said lower drive line assembly including a lower driveshaft journally supported from said pontoon assembly and operably coupled to said pivot driveshaft.

9. The amphibious vehicle of claim 8, wherein said transmission output shaft, said upper driveshaft, said pivot driveshaft and said lower driveshaft are operably coupled by a power transmission belt.

10. The amphibious vehicle of claim 8, wherein said lower drive line assembly further comprises a clutch assembly having an input operably coupled to said lower driveshaft and output operably coupled to said set of wheels and said marine drive unit to selective transmit torque thereto.

11. The amphibious vehicle of claim 8, wherein said upper driveshaft is operably coupled to a rear pivot driveshaft for driving a set of rear wheels and said upper drive line assembly further includes an upper prop shaft journally supported from said frame structure at said outboard edge and operably coupled to a front pivot driveshaft for driving a set of front wheels.

12. The amphibious vehicle of claim 11, wherein said lower drive line assembly further comprises:

a front clutch assembly having an input operably coupled to said front lower driveshaft and an output operably coupled to said set of front wheels; and a rear clutch assembly including a first clutch unit having an input operably coupled to said rear lower driveshaft and an output operably coupled to said marine drive unit and a second clutch unit having an input operably coupled to said rear lower driveshaft and an output operably coupled to said set of rear wheels;

said front and rear clutch assemblies being selectively engagable to provide front wheel drive, rear wheel drive and marine unit drive in any combination.

13. The amphibious vehicle of claim 1 wherein said marine drive unit comprises a left jet propulsion unit disposed in a left pontoon and a right jet propulsion unit disposed in a right pontoon, each of said jet propulsion units including:

an inlet for drawing water into said jet propulsion unit;

an outlet nozzle for discharging water from said jet propulsion unit;

a collar pivotally coupled to said outlet nozzle for generating a jet of water having a vertical component and a horizontal component when said collar is pivoted, wherein said vertical component of said left jet propulsion unit is in an opposite direction from said vertical component of said right jet propulsion unit and wherein said horizontal component of said left jet propulsion unit and said horizontal component of said right jet propulsion unit are in the same direction.

14. The amphibious vehicle of claim 13 wherein each of said collars are pivotally coupled to said outlet nozzle along a pivot axis which is angular oriented off of a vertical axis of said pontoon assembly, said angular orientation of said collar associated with said left jet propulsion unit being disposed in an opposite direction from said angular orientation of said collar associated with said right jet propulsion unit.

15. The amphibious vehicle of claim 14, wherein said collar comprises a cylindrical sleeve pivotally coupled to said outlet nozzle and having an inner wall with a baffle disposed along said pivot axis.

16. The amphibious vehicle of claim 1 further comprising a steering system for directionally controlling the amphibious vehicle during land use, said steering system including:

a steering mechanism mounted on said frame structure for generating coordinated lateral movement of a tie rod;

a steering knuckle associated with said set of wheels; and a steering interlock for mechanically interconnecting said tie rod to said steering knuckle when said pontoon assembly is in said raised position and for mechanically disconnecting said tie rod from said knuckle when said pontoon assembly is in said lowered position.

17. The amphibious vehicle of claim 16, wherein said steering interlock further comprises:

an upper pitman arm pivotally connected at a first end to said tie rod;

an upper drop shaft journally supported from said frame structure for rotational movement and having an upper end secured to a second end of said upper pitman arm and a collar disposed on a lower end thereof;

a lower tie rod pivotally connected at a first end to said knuckle;

a lower pitman arm pivotally connected at a first end to said lower tie rod opposite said knuckle; and a lower drop shaft journally supported from said pontoon assembly for rotational movement and having a lower end secured to a second end of said lower pitman arm and a hub disposed on an upper end thereof;

wherein said hub engages said collar when said pontoon assembly is positioned in said raised position to mechanically interconnect said upper and lower drop shafts, and wherein said hub disengages said collar to mechanically disconnect said upper and lower drop shafts when said pontoon assembly is positioned in said lowered position.

18. The amphibious vehicle of claim 17, wherein said steering interlock further comprises a biased locking member disposed on said lower drop shaft, said biased locking member engaging said hub when said pontoon assembly is positioned in said lower position to prevent rotation of said lower drop shaft.

19. The amphibious vehicle of claim 18, wherein said steering interlock further comprises means for mechanically interconnecting a brake actuator with a brake assembly associated with said set of wheels, including:

said upper and lower drop shafts having a bore therethrough;

an upper pin disposed within said bore of said upper drop shaft;

a lower pin disposed within said bore of said lower drop shaft and alignable in an end to end relationship with said upper pin for transmitting reciprocating movement therebetween when said lower drop shaft is aligned with said upper drop shaft in an end to end relationship;

an upper linkage operably interconnecting said brake actuator with said upper pin such that movement of said brake actuator reciprocates said upper pin; and a lower linkage operably interconnecting said lower pin with said brake assembly such that reciprocation of said lower pin actuates said brake assembly.

20. The amphibious vehicle of claim 1 further comprising means for hydraulically interconnecting a brake actuator with a brake assembly associated with said set of wheels.

21. The amphibious vehicle of claim 1 further comprising a suspension assembly interdisposed between said set of wheels and said pair of pontoons to suspend said frame structure above said set of wheels and to provide vertical movement of said set of wheels relative to said pontoon assembly when said pontoons are stored.

22. The amphibious vehicle of claim 1 wherein each of said pontoons further comprises an inboard surface, an outboard surface, a top surface having said set of wheels operably extending therefrom, and a contoured bottom surface having a generally W-shaped cross-section.

23. The amphibious vehicle of claim 1 further comprising a removable panel assembly for a vehicle body having a plurality of panels removably positionable in a opening formed in a vehicle body, each of said panels having a top portion, a first and second flange extending downwardly from said top portion, and a first drain channel formed at an end of said first flange and a second drain channel formed at an end of said second flange, and whereby said plurality of panels are adjacently positioned within said opening such that first drain channel of one of said plurality of panels interlocks with said second drain channel of another of said plurality of panels.

24. The removable panel assembly of claim 23 wherein said first and second drain channels are V-shaped drain channels.

25. The removable panel assembly of claim 24 wherein said plurality of panels are sized to be stowable within said vehicle body.

26. A steering interlock assembly for mechanically connecting and disconnecting a tie rod from a steering arm of a vehicle, said steering interlock assembly comprising:

an upper assembly including an upper pitman arm pivotally connected at a first end to the tie rod, an upper drop shaft operably coupled to the vehicle for rotational movement and having a first end secured to a second end of said upper pitman arm and a collar disposed on a second end thereof; and a lower assembly including a lower tie rod pivotally connected at a first end to a knuckle, a lower pitman arm pivotally connected at a first end to said lower tie rod, and a lower drop shaft operably coupled to the vehicle for rotational movement and having a first end secured to a second end of said lower pitman arm and a hub disposed on a second end thereof;

said lower assembly being positionable relative to said upper assembly between a first position wherein said hub engages said collar to mechanically connect said upper drop shaft to said lower drop shaft and a second position wherein said hub disengages said collar to mechanically disconnect said upper drop shaft from said lower drop shaft.

27. The steering interlock assembly of claim 26 further comprising a biased locking member disposed on said lower drop shaft, said biased locking member engaging said hub when said lower assembly is positioned in said second position to prevent rotation of said lower drop shaft.

28. The steering interlock assembly of claim 27 further comprising means for mechanically interconnecting a brake actuator with a brake assembly, including:

said upper and lower drop shafts having a bore therethrough;

an upper pin disposed within said bore of said upper drop shaft;

a lower pin disposed within said bore of said lower drop shaft and alignable in an end to end relationship with said upper pin for transmitting reciprocating movement therebetween when said lower drop shaft is aligned with said upper drop shaft in an end to end relationship;

an upper linkage operably interconnecting the brake actuator with said upper pin such that movement of the brake actuator reciprocates said upper pin; and a lower linkage operably interconnecting said lower pin with the brake assembly such that reciprocation of said lower pin actuates the brake assembly.

29. A removable panel assembly for a vehicle body comprising:

a support frame disposed within the vehicle body to define an opening therein, said support frame having a drain gutter formed therein;

a plurality of panels supported by said support frame and removably positionable in said opening;

each of said panels having a top portion, a first and second flange extending downwardly from said top portion, and a first drain channel formed at an end of said first flange and a second drain channel formed at an end of said second flange;

whereby said plurality of panels are adjacently positioned within said opening such that first drain channel of one of said plurality of panels interlocks with said second drain channel of another of said plurality of panels, and such that said first and second drain channels are in fluid communication with said drain gutter for directing water away from said opening.

30. The removeble panel assembly of claim 29 wherein said first and second drain channels are V-shaped drain channels.

31. The removable panel assembly of claim 30 wherein said plurality of panels are sized to be stowable within said vehicle body.

* * * * *

UNITED STATES PATENT AND TRADEMARK OFFICE
CERTIFICATE OF CORRECTION

PATENT NO. : 5,687,669
DATED : November 18, 1997
INVENTOR(S) : Manfred W. Engler It is certified that error appears in the above-indentified patent and that said Letters Patent is hereby corrected as shown below:

On the Title Page, under U.S. Patent Documents, reference 4,838,194, "Willaimson" should be -- Williamson --.

Column 3, line 49, "37'which" should be -- 37' which --.

Column 3, line 55, "a" should be -- an --.

Column 4, line 63, "ration" should be -- ratio --.

Column 5, line 3, "from" should be "front".

Column 5, line 41, ". With" should be ", with".

Column 5, line 52, "21 0" should be "210".

Column 6, line 9, after "304" insert -- having --.

Column 6, line 50, "rack,334" should be "rack 334".

Column 7, line 37, "visa" should be -- vice --.

Column 7, line 52, "intermeshing" should be -- intermeshingly --.

Column 7, line 56, "longitudinal" should be -- longitudinally --.

Column 7, lines 61 & 62, "complimentary" should be -- complementary --.

UNITED STATES PATENT AND TRADEMARK OFFICE
CERTIFICATE OF CORRECTION

PATENT NO. : 5,687,669
DATED : November 18, 1997
INVENTOR(S) : Manfred W. Engler It is certified that error appears in the above-indentified patent and that said Letters Patent is hereby corrected as shown below:

Column 8, line 1, "intermeshing" should be -- intermeshingly --.

Column 8, line 52, "portions" should be -- portion --.

Column 10, line 38, "FIGS." should be -- FIG. --.

Column 12, line 42, "complimentary" should be -- complementary --.

Column 13, lines 6 and 7, "line" should be -- lines --.

Column 13, line 19, "558" should be -- 556 --.

Column 13, line 42, "From" should be -- Front --.

Column 13, line 57, "FIGS." should be -- FIG. --.

Column 16, line 46, "selective" should be -- selectively --.

Column 17, line 20, "angular" should be -- angularly --.

UNITED STATES PATENT AND TRADEMARK OFFICE
CERTIFICATE OF CORRECTION

PATENT NO. : 5,687,669
DATED : November 18, 1997
INVENTOR(S) : Manfred W. Engler It is certified that error appears in the above-indentified patent and that said Letters Patent is hereby corrected as shown below:

Column 18, line 41, "a" should be -- an --.

Column 20, line 26, "removeable" should be -- removable --.

Signed and Sealed this

Seventh Day of July, 1998

Attest:

BRUCE LEHMAN

Attesting Officer

Commissioner of Patents and Trademarks